Dec. 17, 1935.     E. C. CURTIS     2,024,680
APPARATUS FOR THE MANUFACTURE OF AMMONIUM CHLORIDE
Filed Sept. 17, 1932
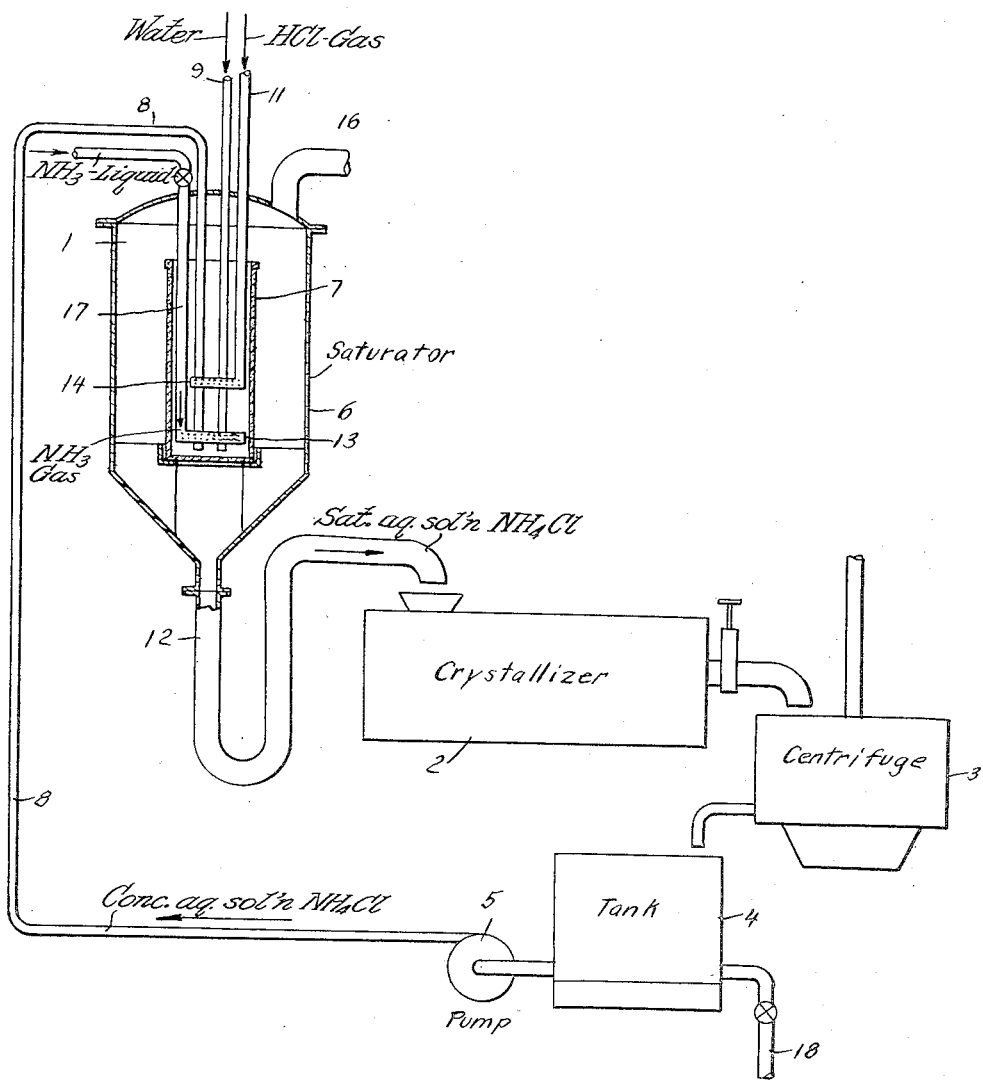
INVENTOR
Elam C. Curtis
BY
ATTORNEYS

UNITED STATES PATENT OFFICE 2,024,680

APPARATUS FOR THE MANUFACTURE OF AMMONIUM CHLORIDE

Elam C. Curtis, Niagara Falls, N. Y., assignor to The Mathieson Alkali Works, Inc., New York, N. Y., a corporation of Virginia Application September 17, 1932, Serial No. 633,561

3 Claims. (Cl. 23—285)

This invention relates to an improved saturator of special value in the manufacture of ammonium chloride. This improved saturator, however, is of more general application in similar operations.

Several methods for the manufacture of ammonium chloride have hitherto been practiced and proposed. In one type, aqueous ammonia is neutralized with hydrochloric acid, as either aqueous hydrochloric acid or gaseous hydrochloric acid, to form relatively dilute aqueous solutions of ammonium chloride from which this salt is recovered by evaporation. In another type, gaseous ammonia is neutralized with gaseous hydrochloric acid. This type of method involves the use of apparatus inordinately large with respect to its production and the reaction so effected tends to produce an ammonium chloride fog from which complete recovery of ammonium chloride is difficult if not impossible. The improved saturator of this invention eliminates any necessity for evaporation of dilute solutions of ammonium chloride, the apparatus is of moderate size with respect to its production, and it avoids difficulties consequent upon the formation of ammonium chloride fog.

In applying the saturator of the present invention in connection with the manufacture of ammonium chloride, the reactants, ammonia and hydrochloric acid, are brought together at an elevated temperature in a liquid body of an aqueous medium containing dissolved ammonium chloride in high concentration substantially to saturate the medium with respect to ammonium chloride at the reaction temperature and ammonium chloride is crystallized from the saturated medium, advantageously by cooling. The reaction involved is highly exothermic and, as effected in accordance with the invention with the reactants in high concentrations, the large amount of heat liberated is also concentrated. In the saturator of this invention this heat is absorbed as heat of vaporization of the ammonia supplied to the reaction, this ammonia being initially supplied as anhydrous liquid ammonia and being vaporized, by expansion, in heat exchanging relation with the reaction mixture. So far as necessary to maintain the desired reaction temperature, additional heat liberated by the reaction is absorbed as heat of vaporization of water supplied to the reaction mixture as liquid water, a vaporizable diluent, this vaporization of water supplementing the vaporization of the ammonia in absorbing the reaction heat. The reactants enter the liquid media in which the reaction is effected as gases, and are thus supplied in high concentration, but by effecting the reaction in a liquid medium in which the reaction product, ammonium chloride, as well as the reactants, is soluble, economy of apparatus is accomplished and the formation of ammonium chloride fog is avoided. Further to limit any tendency toward the formation of ammonium chloride fog, the operation is with advantage so conducted that the ammonia is dissolved in the liquid medium in which the reaction is effected before the ammonia and the hydrochloric acid are brought together. The operation of the saturator is continuous, the liquid reaction medium, an aqueous solution of ammonium chloride containing dissolved ammonium chloride in high concentration, together with any necessary water, being continuously supplied to the liquid body in which the reaction is effected and the liquid reaction medium, substantially saturated with respect to ammonium chloride, being continuously discharged therefrom. The operation is, with advantage, carried out cyclically, the liquid medium in which the reaction is effected being circulated from the liquid body, into which the reactants are introduced, through a crystallizing operation and back to the liquid body, ammonium chloride being separated from the saturated medium circulating from the liquid body to the crystallizing operation therein. In cyclic operation, a part of the circulating liquid reaction medium is with advantage regularly discharged from the operation to avoid the accumulation of impurities in the circulating medium.

The improved saturator of the invention comprises a closed chamber, a vessel arranged within and opening at its upper end into this chamber, a connection for supplying a liquid reaction medium to this vessel and a connection for discharging the liquid reaction medium overflowing from this vessel into the chamber from the lower end of the chamber, separate means for introducing two gaseous reactants into the vessel, one of these means comprising means for vaporizing one of the reactants in heat exchange with the contents of the vessel, and a vent from the upper end of the chamber. Means may also be provided for introducing a vaporizable diluent into the vessel within the chamber. Heat of reaction liberated within the vessel is absorbed, principally, as heat of vaporization of the vaporized reactant and of any vaporizable diluent supplied. The liberation of heat is confined to the vessel within the chamber and the chamber is relieved of the more severe burdens imposed by such liberation of heat.

By virtue of this same arrangement, relatively high temperatures of reaction may be maintained in the vessel. The means for introducing the two gaseous reactants are with advantage arranged so that the reactant vaporized in heat exchange with the contents of the vessel is introduced into the vessel at a lower point and the other at a higher point.

The invention will be further described in connection with the accompanying drawing which illustrates, diagrammatically and conventionally, in elevation and partly in section and with parts broken away, one form of apparatus embodying the invention.

The apparatus illustrated comprises a saturator 1, a crystallizer 2, a centrifuge 3, a tank 4 and a circulating pump 5. The crystallizer 2 may be a continuous crystallizer of any conventional type. The centrifuge 3 may be of any conventional type.

The saturator 1 comprises a closed chamber 6, a vessel 7 arranged within the chamber 6 and opening at its upper end into the chamber 6, a connection 8 through which the liquid reaction medium is supplied to the vessel 7, a connection 9 for supplying a vaporizable diluent to the vessel 7, a connection 10 for supplying one reactant, a connection 11 for supplying the other reactant, a connection 12 for discharging the liquid reaction medium from the lower end of the chamber 6 and a vent 16 for discharging vapors and gases from the upper end of this chamber. Connections 10 and 11 terminate in diffusers 13 and 14 respectively. Connection 10 includes an expansion valve 15. The vent 16 may be connected, for example, to conventional scrubbing apparatus.

In the production of ammonium chloride in the apparatus illustrated, in accordance with the invention, an aqueous liquid reaction medium containing dissolved ammonium chloride in high concentration is cyclically circulated from the saturator 1 through the crystallizer and centrifuge 2 and 3 and back to the saturator 1 by means of pump 5, tank 4 being provided in the circulatory path to permit continuously uniform operation of the saturator independently of intermittent separation of the crystallized product in the centrifuge 3. The circulating liquid reaction medium, supplied to the saturator 1 through connection 8, is introduced into the lower end of the vessel 7. A liquid body of the reaction medium is maintained in the vessel 7, the reaction medium overflowing from the upper end of this vessel into the chamber 6. Anhydrous liquid ammonia is supplied through connection 10, is expanded through valve 15 and is vaporized as it flows through the connection 17 and the diffuser 13 within the vessel 7. The vaporization of the ammonia expanded through valve 15 is thus effected in heat exchanging relation with the contents of the vessel 7. Gaseous hydrochloric acid is introduced into the vessel 7 through connection 11 and water, as a liquid, is introduced through connection 9. The ammonia entering the vessel 7 through the diffuser 13 dissolves rapidly in the liquid reaction medium, the mother liquor from which the ammonium chloride product has been separated in the crystallizing operation diluted with water, in the lower end of the vessel 7. Hydrochloric acid entering the vessel 7 through the diffuser 14 reacts in the liquid body maintained therein with the ammonia entering through the diffuser 13 to form ammonium chloride which dissolves in the liquid reaction medium. The rates at which the ammonia and hydrochloric acid are supplied through connections 10 and 11 respectively, are regulated to maintain the amounts supplied equal, measured as molecular quantities, and the rate at which the liquid reaction medium is supplied, through connection 8, is regulated with respect to the rates at which ammonia and hydrochloric acid are supplied to maintain the reaction mixture discharged from the saturator 1 through connection 12 substantially saturated with respect to ammonium chloride. Water is supplied, through connection 9, at a rate regulated to maintain the reaction temperature within the vessel 7 within the desired limits, this supplementary absorption of heat affording control of the reaction temperature being effected by evaporation of water within the vessel 7 and from the liquid medium flowing downwardly over the walls of the vessel 7 in the chamber 6 after overflowing the upper end of the vessel 7. A temperature approximating, for example, 65°–95° C. may be maintained within the vessel 7. Instead of being introduced into the vessel 7 through connection 9, the water supplied as a vaporizable diluent may be added, for example, to the circulating liquid reaction medium in the tank 4. That is, this vaporizable diluent may be introduced directly into the vessel 7 or it may be supplied to the vessel 7 together with the liquid reaction medium. The liquid reaction medium, substantially saturated with respect to ammonium chloride, flows from the lower end of the saturator 1, through connection 12, to the crystallizer 2. In the crystallizer, the ammonium chloride product may be crystallized by cooling or by cooling and evaporation, for example. When the crystallization involves evaporation of water from the liquid reaction medium, the amount of water added as a diluent is increased to replace water so removed from the circulating liquid medium. The crystallized ammonium chloride product is separated from the liquid reaction medium, the mother liquor from the separation, in the centrifuge 3, and the separated liquid reaction mixture is returned to the operation through tank 4. In order to avoid the accumulation of impurities in the circulating liquid reaction mixture, a part of the circulating liquid medium is regularly discharged, intermittently or continuously, through connection 18. The aqueous solution of ammonium chloride so discharged through connection 18 may be separately subjected to appropriate operations for recovery of its ammonium chloride content.

In the apparatus illustrated, the liberation of heat by the reaction between the ammonia and the hydrochloric acid is confined, substantially entirely, to the reaction vessel 7, and the heat there liberated is absorbed, as heat of vaporization of ammonia expanded into connection 17 through valve 15, as heat of vaporization of water within the reaction vessel 7 and as heat of vaporization of water vaporized from the reaction mixture flowing downwardly over the relatively large outer surface of the walls of the reaction vessel 7. Thus, the elevated temperatures attained are limited and controlled, and the liberation of heat is confined to the inner vessel 7 within the outer chamber 6. The outer chamber 6 is itself protected from the temperatures attained within the inner vessel 7, and from burdens imposed by the liberation of heat therein, by the absorption of heat as heat of vaporization within the inner vessel 7 and from the outer surface of the walls of the inner vessel 7, the latter being spaced from the inner surface of the walls of the outer chamber 6. For the manufacture of ammonium chloride, the vessel 7 may be constructed of conventional chemical stone ware and the chamber 6 may be constructed of steel and lined with rubber in the conventional manner, for example. In the apparatus of the invention, the use of a rubber lining for the outer chamber of the saturator becomes practicable, in application of the apparatus for the production of ammonium chloride for example, because the liberation of heat by the reaction effected in the apparatus is confined to the inner vessel.

The saturator of the invention is with advantage used in conjunction with operations for the direct production of gaseous hydrochloric acid, by the direct union of chlorine and hydrogen for example, since the hydrochloric acid so produced may, in accordance with this invention, be supplied directly to the saturator in which the reaction is effected.

I claim:

1. An improved saturator comprising a closed chamber, a vessel arranged within and opening at its upper end into said chamber, a connection for supplying a liquid reaction medium to said vessel and a connection for discharging the liquid reaction medium from the lower end of said chamber, separate means for introducing two gaseous reactants into said vessel, means for vaporizing one of the reactants in heat exchange with the contents of said vessel, and a vent from the upper end of said chamber.

2. An improved saturator comprising a closed chamber, a vessel arranged within and opening at its upper end into said chamber, a connection for supplying a liquid reaction medium to said vessel and a connection for discharging the liquid reaction medium from the lower end of said chamber, separate means for introducing two gaseous reactants into said vessel, means for vaporizing one of the reactants in heat exchange with the contents of said vessel, means for introducing a vaporizable diluent into said vessel, and a vent from the upper end of said chamber.

3. An improved saturator comprising a closed chamber, a vessel arranged within and opening at its upper end into said chamber, a connection for supplying a liquid reaction medium to said vessel and a connection for discharging the liquid reaction medium from the lower end of said chamber, means for introducing a gaseous reactant into said vessel at a lower point, means for vaporizing reactant in heat exchange with the contents of said vessel, means for introducing another gaseous reactant into said vessel at a higher point, and a vent from the upper end of said chamber.

ELAM C. CURTIS.

CERTIFICATE OF CORRECTION.

Patent No. 2,024,680. December 17, 1935.

ELAM C. CURTIS.

It is hereby certified that error appears in the printed specification of the above numbered patent requiring correction as follows: Page 3, second column, line 24, claim 3, after "vaporizing" insert said; and that the said Letters Patent should be read with this correction therein that the same may conform to the record of the case in the Patent Office.

Signed and sealed this 18th day of February, A. D. 1936.

Leslie Frazer (Seal)                    Acting Commissioner of Patents.